US010221894B2

(12) United States Patent
St. Pierre et al.

(10) Patent No.: US 10,221,894 B2
(45) Date of Patent: Mar. 5, 2019

(54) UNIVERSAL JOINT (71) Applicant: Ulterra Drilling Technologies, L.P., Forth Worth, TX (US)

(72) Inventors: Beau J. St. Pierre, Hudson Oaks, TX (US); Jason Maw, Beaumont (CA); Man Kang Ng Moreira, Edmonton (CA)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 0 days.

(21) Appl. No.: 14/838,155

(22) Filed: Aug. 27, 2015

(65) Prior Publication Data
US 2016/0060970 A1    Mar. 3, 2016

Related U.S. Application Data (60) Provisional application No. 62/043,928, filed on Aug. 29, 2014.

(51) Int. Cl.
*F16D 3/44* (2006.01)
*F16D 3/18* (2006.01)
*E21B 17/04* (2006.01)
*F16D 3/36* (2006.01)

(52) U.S. Cl.
CPC .............. *F16D 3/18* (2013.01); *E21B 17/04* (2013.01); *F16D 3/36* (2013.01)

(58) Field of Classification Search
CPC .............. F16D 3/18; F16D 3/36; E21B 17/04
USPC ........................................ 464/157, 149, 151
See application file for complete search history.

(56) References Cited

U.S. PATENT DOCUMENTS 763,127 A * 6/1904 Tilden ...................... F16D 3/18
 464/157
1,155,629 A * 10/1915 Turon ................. B60B 27/0005
1,261,962 A * 4/1918 Scott ........................ F16D 3/18
 464/157

(Continued)

FOREIGN PATENT DOCUMENTS

DE 27 30 486 A1 * 1/1979
EP 0048564 A2 3/1982

(Continued)

OTHER PUBLICATIONS

Final Office Action received from the U.S. Patent and Trademark Office in U.S. Appl. No. 15/160,809, dated Aug. 30, 2017, 12 pages.

(Continued)

*Primary Examiner* — Greg Binda
(74) *Attorney, Agent, or Firm* — Kilpatrick Townsend & Stockton (57) ABSTRACT

A universal joint assembled in a drill string transfers torque between two components where the shafts of the components are not completely aligned. The universal joint includes two members each with pin connections on one end and axially extending arms on the other end. The axially extending arms intermesh when the members are assembled defining a closed cavity between the arms. The cavity retains a ball bearing held between two seats. The universal joint when assembled to portions of the drill string at the pins on each end transfer torque by intermeshing of the teeth. Axial force is transferred through the seats holding the ball bearing.

17 Claims, 9 Drawing Sheets

(56) References Cited

U.S. PATENT DOCUMENTS

| | | | |
|---|---|---|---|
| 1,314,990 A | | 9/1919 | Stockwell |
| 1,324,063 A | * | 12/1919 | Noel .................. F16D 3/18 464/157 |
| 1,355,516 A | | 10/1920 | Rodolphe |
| 1,362,646 A | | 12/1920 | Stockwell |
| 1,373,393 A | * | 3/1921 | Langworthy ............ F16D 3/44 464/151 X |
| 1,376,504 A | | 5/1921 | Behn |
| 1,421,072 A | * | 6/1922 | Emet .................. F16D 3/18 464/157 |
| 1,479,755 A | | 1/1924 | Stokes |
| 1,488,291 A | | 3/1924 | Schell |
| 1,550,458 A | | 8/1925 | Schell |
| 2,025,825 A | | 12/1935 | Ricefield |
| 2,217,969 A | * | 10/1940 | Schairer ............... F16D 3/18 464/157 X |
| 2,301,659 A | | 11/1942 | Ricefield |
| 2,319,027 A | | 5/1943 | Aker |
| 2,647,380 A | | 8/1953 | Henry et al. |
| 3,497,083 A | | 2/1970 | Anderson et al. |
| 3,757,879 A | | 9/1973 | Wilder et al. |
| 3,895,502 A | | 7/1975 | Schwarz |
| 4,055,966 A | | 11/1977 | Fredericks |
| 4,449,956 A | | 5/1984 | Ueno |
| 4,947,942 A | * | 8/1990 | Lightle ................. A61C 1/185 464/157 X |
| 4,982,801 A | | 1/1991 | Zitka et al. |
| 5,000,723 A | | 3/1991 | Livingstone |
| 5,019,015 A | | 5/1991 | Wasserfuhr |
| 5,048,622 A | | 9/1991 | Ide |
| 5,053,687 A | | 10/1991 | Merlet |
| 5,651,737 A | * | 7/1997 | Le Blanc ............... F16D 3/18 464/157 X |
| 5,740,699 A | | 4/1998 | Ballantyne et al. |
| 6,676,526 B1 | | 1/2004 | Poster |
| 6,896,473 B2 | | 5/2005 | Schuler |
| 7,004,843 B1 | | 2/2006 | Kerstetter |
| 7,367,772 B2 | | 5/2008 | Khajepour et al. |
| 8,251,938 B1 | | 8/2012 | Morcuende et al. |
| 2014/0027185 A1 | | 1/2014 | Menger et al. |
| 2016/0341255 A1 | | 11/2016 | Kummer et al. |
| 2017/0002871 A1 | | 1/2017 | McMillan et al. |
| 2017/0023068 A1 | | 1/2017 | Maw et al. |
| 2017/0081928 A1 | | 3/2017 | Maw et al. |
| 2017/0328416 A1 | | 11/2017 | Maw et al. |
| 2017/0370420 A1 | | 12/2017 | Deen et al. |

FOREIGN PATENT DOCUMENTS

| | | | |
|---|---|---|---|
| FR | 485.872 | * | 2/1918 |
| GB | 15259 | * | 9/1889 |
| RU | 2017930 | | 8/1994 |
| RU | 2526957 | | 8/2014 |
| SU | 700710 | * | 11/1979 |

OTHER PUBLICATIONS

International Search Report and Written Opinion received from the International Search Authority in Patent Cooperation Treaty Application No. PCT/US2015/047387, dated Dec. 10, 2015, 8 pages.

Non-Final Office Action received from the U.S. Patent and Trademark Office in U.S. Appl. No. 15/160,809, dated Dec. 14, 2016, 18 pages.

Non-Final Office Action received from the U.S. Patent and Trademark Office in U.S. Appl. No. 15/195,892, dated Oct. 6, 2017, 9 pages.

Response to Non-Final Office Action filed with the U.S. Patent and Trademark Office in U.S. Appl. No. 15/160,809, dated Jun. 14, 2017, 17 pages.

* cited by examiner

FIG. 14

UNIVERSAL JOINT

FIELD OF THE INVENTION

This invention relates generally to universal joints and more particularly to universal joints used in downhole drill strings.

GENERAL BACKGROUND

In a drilling operation a drill bit is mounted to the end of a drill string. The drill string is rotated from the top of the string or by a motor at the bottom of the string, or both, to rotate the drill bit and advance the borehole. Universal joints are included in the drill string to accommodate eccentricity in the string. The eccentric rotation must be converted into concentric rotation in order for the drill bit to advance the borehole efficiently. Eccentricity in the drill string may be initiated by a motor in the drive assembly that rotates the drill bit or by steering of the bit to change direction of the borehole.

The components of the drill string including the universal joint are subjected to extreme torque forces, elevated operating temperatures and abrasive drilling fluids, all of which can have an adverse effect on the operational life of drill string components. The constant relative movement of the components of the universal joint, together with abrasive drilling mud, causes abrasion and erosion of mating components. Attempts have been made to effectively seal the universal joint assemblies so as to prolong their operational life. Due to the constant relative movement of the components of the universal joint, they do not readily lend themselves to conventional sealing arrangements. Universal joint wear results in pitting of the bearing surfaces from the abrasive drilling fluids. Replacement of the joint or its components requires removal of the drill string from the borehole and downtime for the operation which increases operational expenses substantially.

A universal joint that is less vulnerable to abrasion and erosion with an extended service life would be advantageous.

SUMMARY OF THE INVENTION

The present invention provides a universal joint to be used as part of a downhole drill string.

The drilling fluid includes abrasive particles that contact the bearing surfaces of the universal joint. Relative movement of the bearing surfaces of the joint, together with the abrasive particles, abrades the surfaces. This can severely limit the service life of universal joints with fixed bearing elements such as a rod with bearing surfaces at the end of the rod such as used in conventional joints. A ball bearing has a much larger area to act as a bearing surface. The ball bearing can continually rotate during operation presenting a new bearing face to the opposing bearing seat and extending its service life. Using a ball bearing can also provide a more compact assembly that allows the components of the drill string to be positioned closer together. Other configurations and applications of a drill string are possible.

In one aspect of the present invention, a universal joint assembly for a drill string includes two components each with arms that intermesh with the arms of the other component. The arms collectively define a cavity receiving a ball through which axial pressure is applied from one component to the other.

In one preferred embodiment, a universal joint for a downhole drill string comprises an upper joint member with a first axis and longitudinally extending arms and a lower joint member with a second axis and longitudinally extending arms. The arms of the upper joint member engage the arms of the lower joint member to transmit torque. The upper joint member pivots about the lower joint member at a pivot point and the first axis and second axis coincide at the pivot point.

In another embodiment, a universal joint for downhole drill strings comprises an upper joint member with longitudinally extending arms, a lower joint member with longitudinally extending arms. The arms of the upper and lower joint members are intermeshed with each other and a ball bearing is confined within the arms of the upper and lower joint members.

In another embodiment, a universal joint for a downhole drill string comprises an upper joint member with longitudinally extending arms and a lower joint member with longitudinally extending arms. Articulating bearing surfaces mounted on each of the arms of the upper and lower joint members bear against each other to transmit torque from the upper joint member to the lower joint member.

In another embodiment a method of transferring torque and axial force in a downhole drill string includes engaging extending arms of a first member with extending arms of a second member and retaining a ball bearing between bearing faces along longitudinal axes of each of the first member and the second member. Torque is transferred between the engaging extending arms and axial force is transferred through the ball bearing.

In another aspect of the invention a downhole tool for converting nutation to axial rotation comprises first axially extending arms about a first longitudinal axis, second axially extending arms about a second longitudinal axis and a ball bearing between the first and second arms. The ball bearing defines a pivot point on the first and second longitudinal axes. The first longitudinal axis angularly deflects in relation to the second axis at the pivot point.

In another aspect of the invention, an inventive joint assembly includes first and second bodies each with longitudinally extending interlocking arms at one end and a threaded connector at the opposite end spaced from the arms. An internal blind bore extends between the arms of each body toward the connectors. With the bodies axially aligned and the arms intermeshed, the blind bores retain a ball bearing between first and second seats. Fasteners passing through adjacent arms of the first and second bodies limit axial separation of the cylindrical joints and ensure the ball bearing and seats are retained in the bore.

In another aspect of the invention, an assembly to transfer torque and thrust in a longitudinal downhole drill string includes first and second closed ended tubular bodies correspondingly slotted at the open ends to axially dovetail and form a generally closed cavity. The cavity retains a ball bearing between a first bearing seat at the closed end of the first tubular body and a second bearing seat at the closed end of the second tubular body.

In another aspect of the invention, an assembly to transfer torque includes articulating bearing surfaces oriented with the direction of rotation on bearing supports.

In another aspect of the invention, axial thrust force is transferred through the ball bearing and bearing seats. In another aspect of the invention, torque forces are transferred by the interlocking arms axially dovetailed together. In another aspect of the invention the fasteners passing though adjacent arms of the joint assembly pass through holes in at least one of the arms, and the hole is of larger diameter than the fastener to allow relative movement of the first and second bodies.

In another aspect of the invention, opposed bearing seats and the ball bearing are retained in a housing. In another aspect of the invention, retainers pass through the housing. In another aspect of the invention, retainers seat in recesses of the bearing seats. In another aspect of the invention, retainers pass through an arm of one bearing member into the arm of another bearing member.

DETAILED DESCRIPTION OF THE PREFERRED EMBODIMENT

A drill string in its basic form consists of sections of threaded pipe assembled end to end with a drill bit at a distal end for advancing a borehole. The drill string can be miles long and rotated at a proximal end of the pipe by a drilling rig to turn the drill bit and advance the borehole. There a many different kinds of supplemental components that can be assembled in the drill string to perform a range of functions such as reaming out obstructions from the bore hole, widening the borehole and motors at the distal end to rotate the drill bit.

Mud motors can be installed near the drill bit to drive the drill bit instead of, or in addition to, driving the drill string from the above ground drill rig. Fluid is pumped down the drill string during operation under very high pressure to flush material out of the borehole. A mud motor uses the pressure of the fluid to drive the motor and rotate a drive shaft. The output of the motor is eccentric, with the output shaft rotating about a circle as well as rotating about its axis. In order to limit the stress on the drill string and bit, one or more universal joint is installed as part of the drill string. The universal joint transmits the torque and the axial force of the drill string to the drill bit and removes the eccentric rotational component from the drill string motion.

A preferred embodiment of the present invention is shown in FIGS. 1-6. The universal joint is a loosely joined set of components that can transmit significant torque and axial forces and can simultaneously flex to compensate for misalignment of transmitting and receiving elements.

The disclosed universal joint assembly 10 includes a top joint member 12 and a bottom joint member 14 each with a longitudinal axis. Top member 12 has a pin 12 at one end for joining to a drill string and axially extending arms 24A and 24B at the opposite end spaced from the pin. Arms 24A and 24B are spaced from each other to form a portion of a closed ended channel 28 that extends towards the pin. Bottom member 14 has a corresponding construction with a pin 14 at one end and arms 26A and 26B at the opposite end spaced from the pin and from each other to form a closed ended channel 30. The pins 12', 14' define connectors, which are preferably American Petroleum Institute (API) conforming threaded pins. Top and bottom members 12 and 14 each have a longitudinal axis, LA1 and LA2. The arms of each member extend generally parallel to the respective longitudinal axis; the pin is coaxial with the longitudinal axis. The top and bottom members 12 and 14 assemble together with arms of the top and bottom members intermeshing to form the universal joint assembly 10. Top and bottom members 12, 14 are preferably identical but could have different constructions (as shown).

The closed ended channel 28 and the closed ended channel 30 when assembled overlap to form a generally cylindrical cavity 32. The arms are sized so that they do not completely fill the gap between the corresponding opposite arms when intermeshed. Space between adjacent arms allows the top and bottom members to move relative to each other without binding. The range of motion is limited by the clearance between the arms.

Seats 18, 20 are preferably secured to the closed ends of the channels 28, 30 of the respective top and bottom members 12, 14 to define bearing surfaces facing each other, though discrete seats are not necessary. The top and bottom members when intermeshed retain a bearing element 16 between top bearing face of seat 18 and bottom bearing face of seat 20 in cavity 32. Joint members 12 and 14 are preferably loosely retained one to the other by fasteners 22, 22', though other arrangements are possible. Fastener 22 passes through adjacent arms 24A and 26A, and fastener 22' passes through adjacent arms 24B and 26B. The holes are of greater diameter than the diameter of the fasteners 22, 22'. This allows the upper and lower members to move in relation to each other. The upper member rotates about the ball bearing with the ball bearing rotating on seats 18 and 20. The motion of the upper member in relation to the lower member can include translation transverse to the longitudinal axis. Rotation can be measured as the angular deflection "β" of the longitudinal axis LA1 of the upper member in relation to the longitudinal axis LA2 of the lower member. Angular deflection of member 12 in relation to member 14 is about a pivot point at the center of ball bearing 16. The longitudinal axes LA1 and LA2 generally intersect at the pivot point as member 12 and member 14 pivot in relation to each other.

As torque is applied to the upper end of the universal joint the upper member rotates about the longitudinal axis in relation to the lower member until the intermeshing teeth make contact on one side of each tooth and torque is applied to the lower member. The Rawer member will then begin to rotate and the torque applied transferred to the components lower in the drill string. Axial force applied to the upper member passes through the upper element, to the upper seat in the cavity, to the ball bearing, to the lower seat and into the lower member. The seat and the ball bearing concentrate the axial force at the contact faces. Both the seat and the ball bearing are preferably made of hard materials to keep from deforming at the contact points. Exemplary materials for seats and ball bearings include chrome steel, stainless steel and ceramics such as silicon nitride. The seats may be a hybrid material with a body of softer metal and a bearing surface that contacts the ball bearing of a harder material.

When the upper member is assembled to the lower member, the components can be sized so that the member arms do not bottom out before the seat and ball bearing meet in the cavity. The seats and ball bearing carry the axial load through the universal joint. Although the arms of the upper and lower elements can contact the adjacent arms on one side during operation to transfer torque, the arms are maintained in a generally spaced axial relationship on the other side so that the members maintain relative movement without binding against each other.

The universal joint may be part of an assembly inside the drill string so that there is an outer casing of the drill string with components inside such as the mud motor and universal joint. In some embodiments, the assembly may be extracted from the inside of the drill string and brought to the surface as a separate unit. When tension is applied to the universal joint at the upper member, the ball bearing and the seats may separate. The fasteners 22 and 22' keep the upper and lower members from completely separating. The upper and lower members move apart until fasteners 22, 22' contact the sides of the openings. The upper and lower members are held in an intermeshed relation with the ball bearing and the seats retained in the cavity while tension is applied to the joint. Other operations such as driving the fluid flow in reverse in the drill string can also put the universal joint in tension.

The holes 34 and 36 that receive fasteners 22 and 22' are larger in diameter, at least in part, than the diameter of the fasteners. This allows the fasteners to float in the holes and the two members can move in relation to each other over a defined range without the fasteners binding against the side of the holes. Each hole passes through two adjacent arms. The hole in one arm may be of the same diameter as the fastener and the other arm may be oversized. Alternatively, the holes in both arms may be oversized in relation to the diameter of the Fastener. The fasteners can be retained in the holes by any conventional means. For example, the fasteners can be retained in the holes by collars or the fasteners can be retained in the holes by threaded plugs in the holes outside the ends of the fasteners. Alternatively, the fasteners can have heads and threaded ends to receive nuts that limit axial translation of the fasteners without binding the fasteners in the holes. Other methods may be used to retain the fasteners in the holes.

In an alternative embodiment, the universal joint includes an inner bearing assembly 110' shown in FIGS. 7-11. Universal joint 110 includes joint members 112 and 114 with engaging arms similar to previous embodiments. A ball bearing 116 is held between seats 118, 120 with upper and lower bearing surfaces contacting the ball bearing 116 on opposite sides. Lower bearing member or seat 120 preferably has a cylindrical body with a bearing face 120E at one end wider than the cylindrical body. The surface of the transition from the cylindrical body to the bearing face 120B preferably forms a portion of a sphere. The ball bearing between the upper and lower bearing members are received in a housing 122. Housing 122 is generally tubular with one end 122A with a reduced or constricted opening diameter. The cylindrical body of bearing member 120 extends through the reduced diameter and the truncated cone (i.e., the back or lower side of the enlarged bearing end) portion bears on the inside surface of the constricted opening diameter. The inside diameter of the housing can be slightly larger than the outside diameter of the upper bearing member 118.

The ball bearing and housing of bearing assembly 110 are retained between joint members 112 and 114. The cylindrical body of bearing member 120 and bearing member 118 include recesses 118A and 120A on opposite sides of each member. Retainers 124A and 124B pass through holes in body 114 and engage the recesses of bearing member 120 to retain the bearing member. Likewise, retainers 126A, 126B pass through holes in body 112 and holes in housing 122 and engage recesses 118A of bearing member 118 and retain the bearing member and housing to member 112. Bearing member 120 is also retained in the housing 122 with the cylindrical body extending beyond the housing. The cylindrical body extending beyond housing 122 is received in a cavity 120B of member 114. A portion of housing 122 and/or a portion of member 118 is received in a cavity 118B of member 112.

Bearing member 120 pivots with member 114 in the housing 122 on ball bearing 116. Member 114 pivots in relation to member 112 to accommodate misalignment of components attached to members 112 and 114.

With an axial or compressive force on universal joint 110, member 112 bears on one end of upper bearing member 118 which bears on the ball bearing 116 at the bearing face. Ball bearing 116 bears on bearing face 120E of lower bearing member 120 which bears on member 114. With universal joint 110 in tension, retainers 124 and 126 hold lower member 120 and housing 122 to members 112 and 114. Lower member 118 is retained in housing 122.

Figure 1:
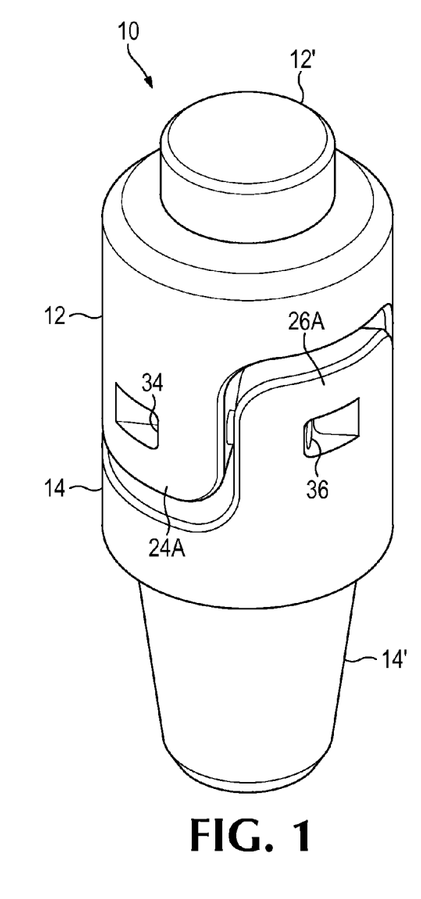
FIG. 1 is a perspective view of the inventive universal joint.
Figure 2:
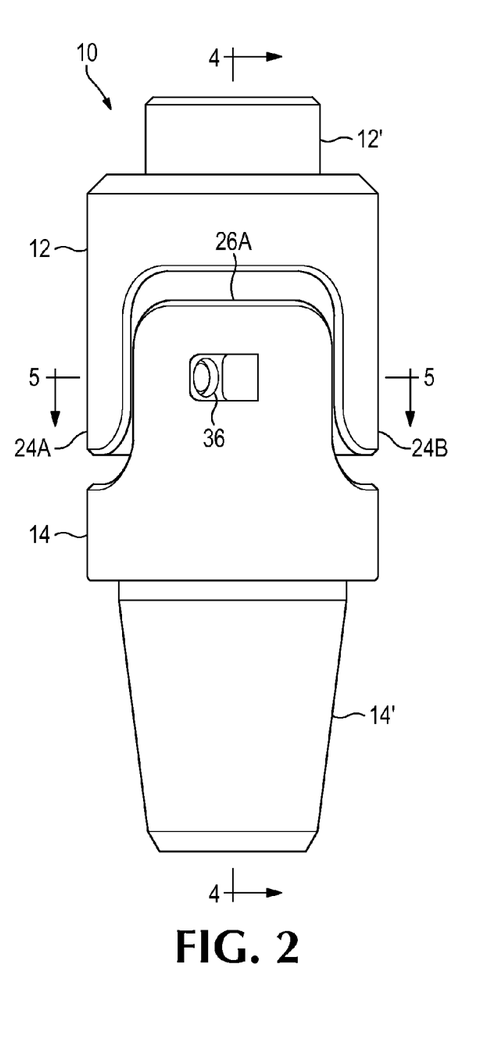
FIG. 2 is a side elevation view of the joint of FIG. 1.
Figure 3:
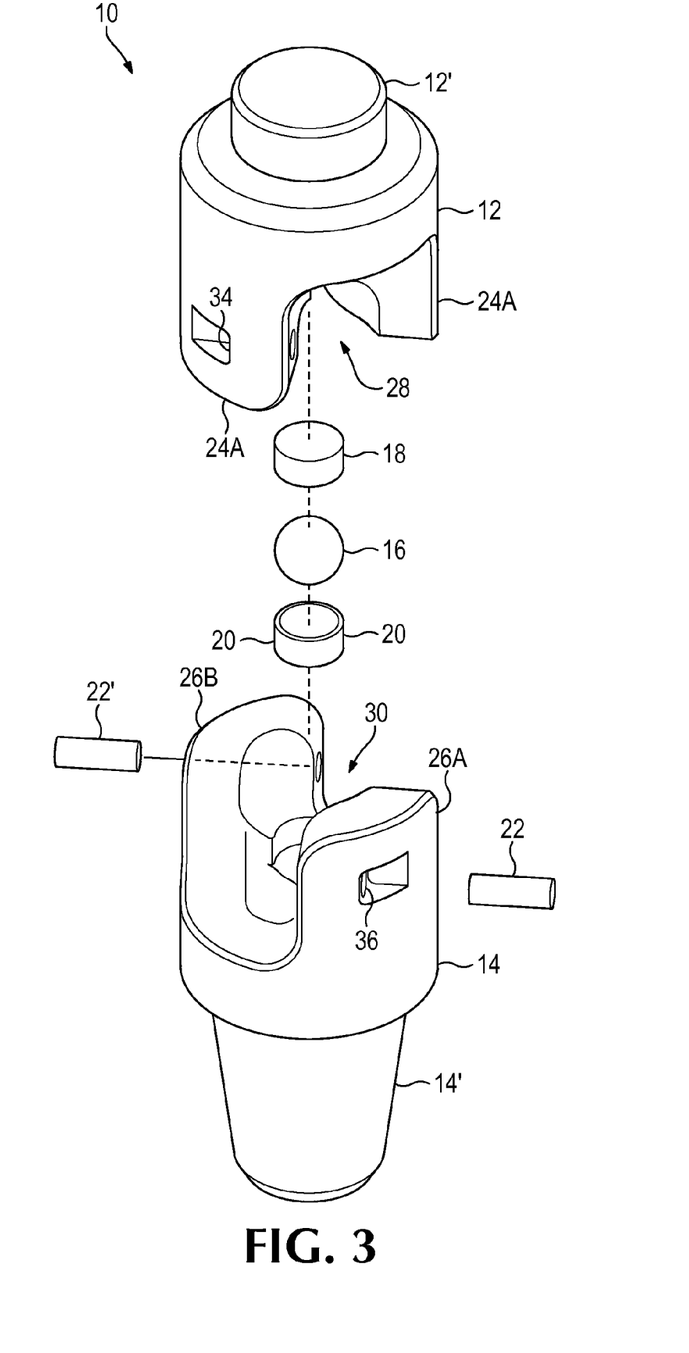
FIG. 3 is an exploded perspective view of the joint of FIG. 1.
Figure 4:
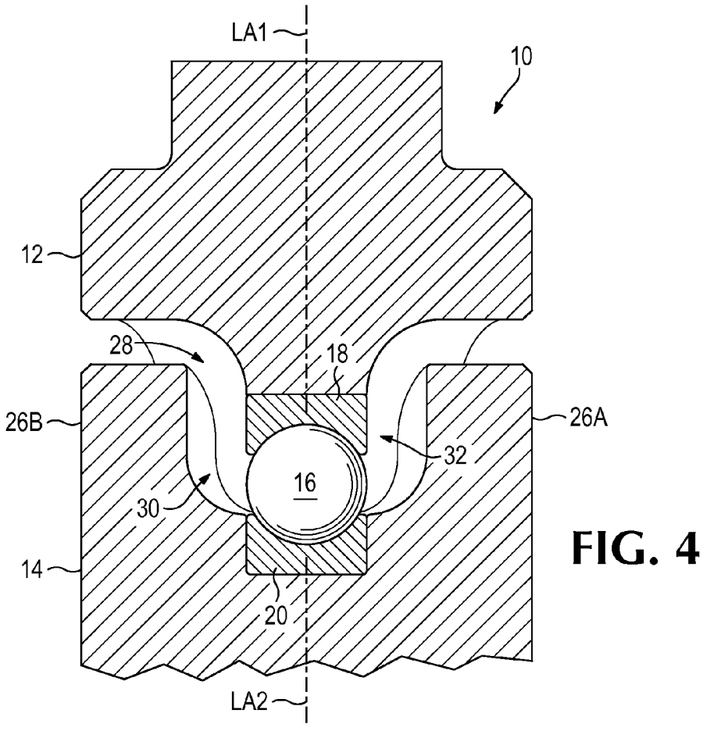
FIG. 4 is a cross section view of the joint of FIG. 1.
Figure 5:
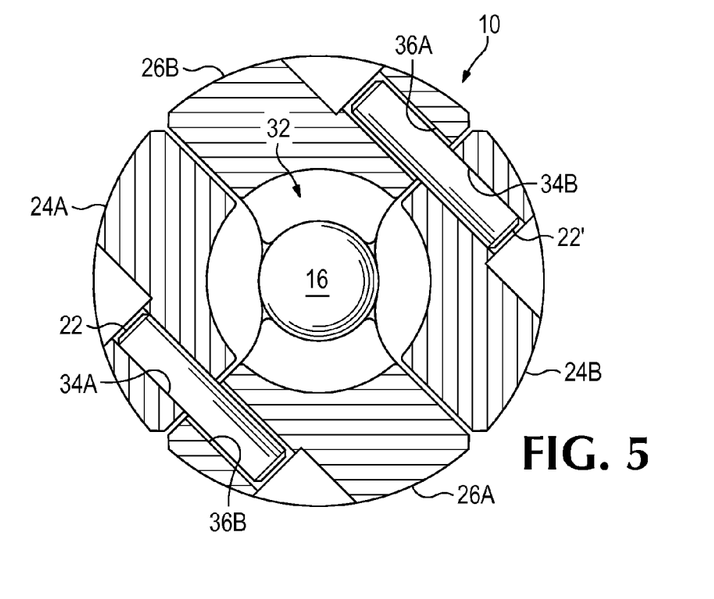
FIG. 5 is a cross-section view of the joint of FIG. 2.
Figure 6:
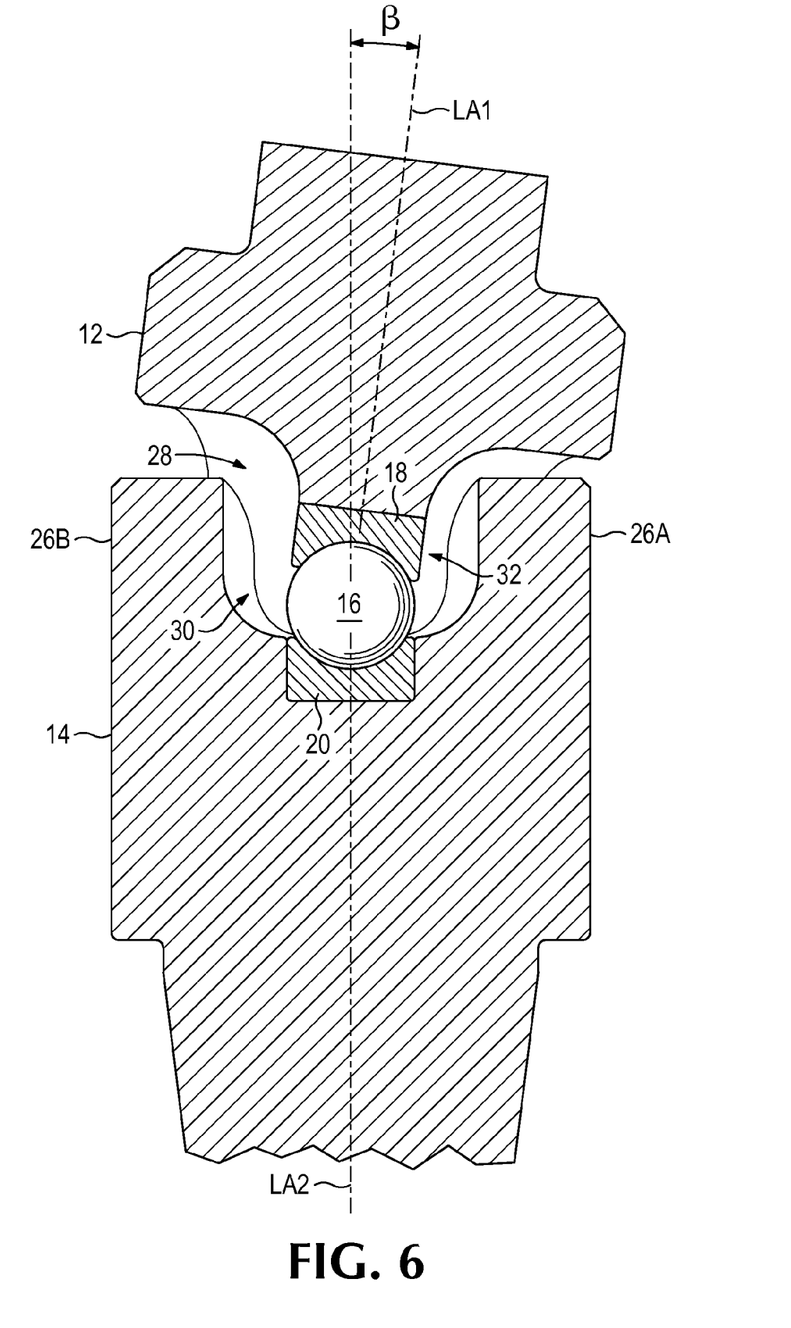
FIG. 6 is a side view of the universal joint the upper member rotated in relation to the lower member.
Figure 7:
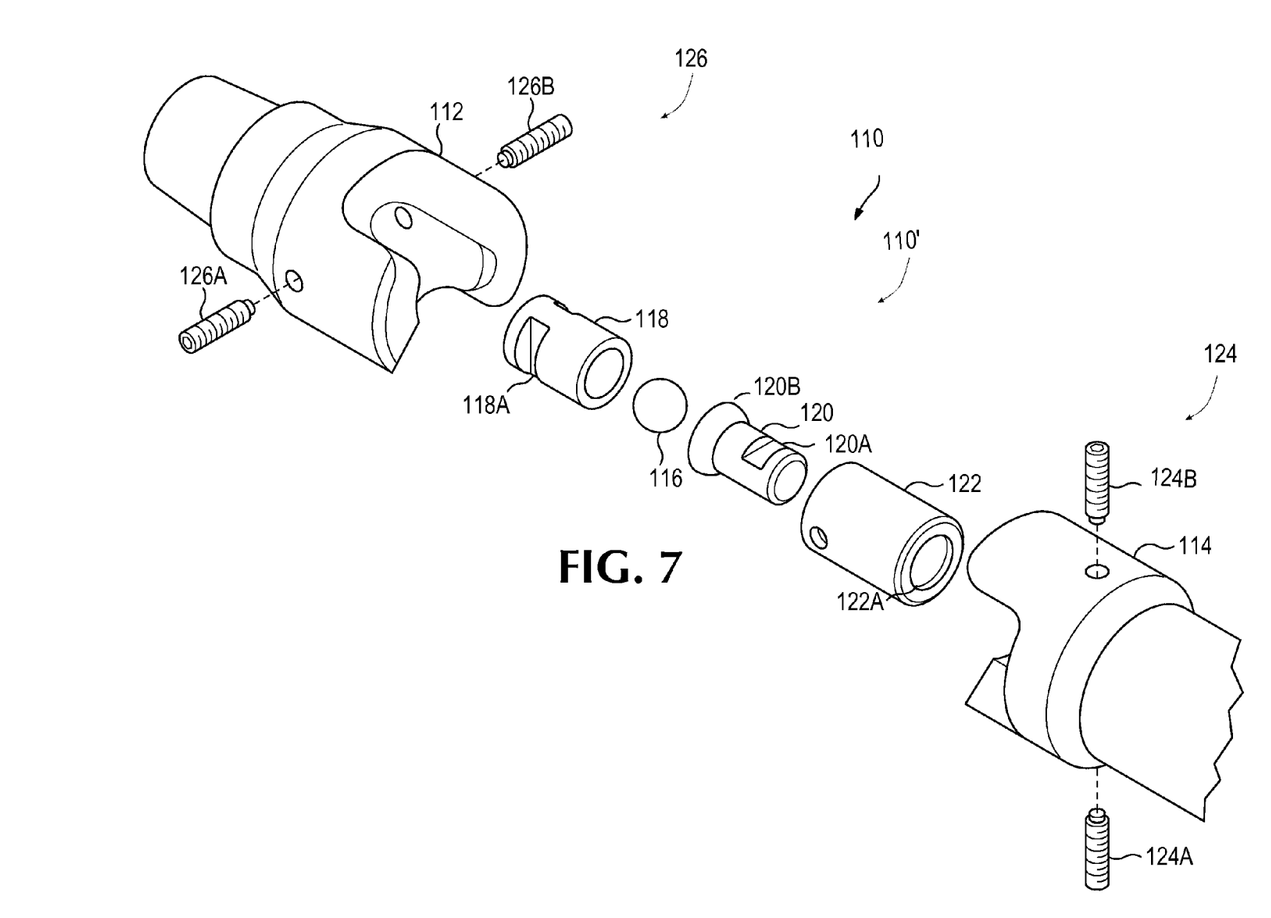
FIG. 7 is a perspective exploded view of another embodiment of a universal joint.
Figure 8:
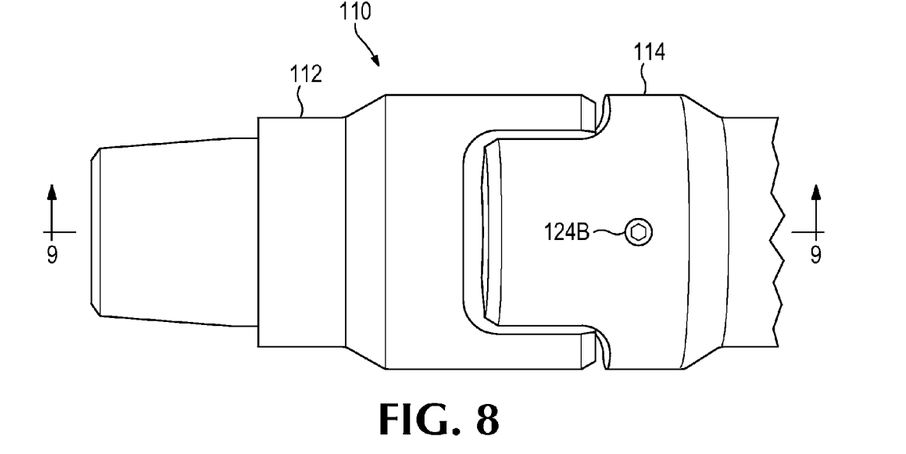
FIG. 8 is a side view of the universal joint of FIG. 7.
Figure 9:
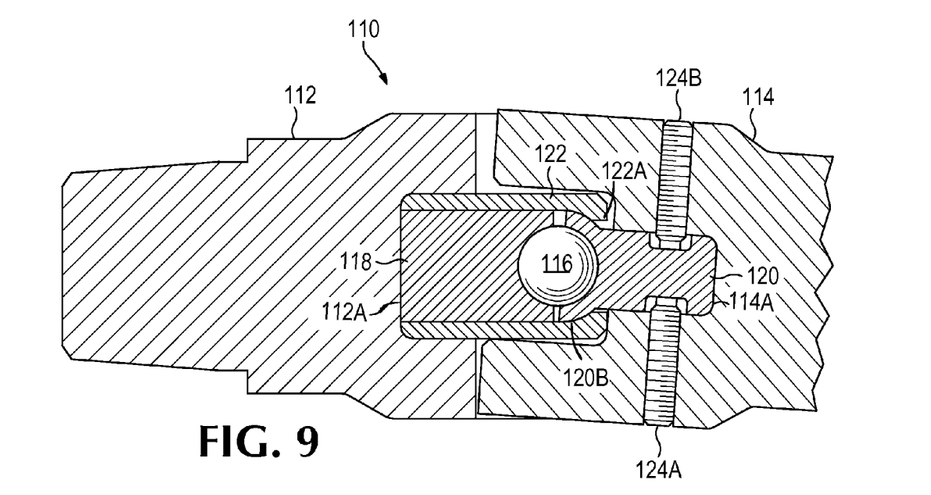
FIG. 9 is a cross section view of the universal joint of FIG. 7 at section 9-9.
Figure 10:
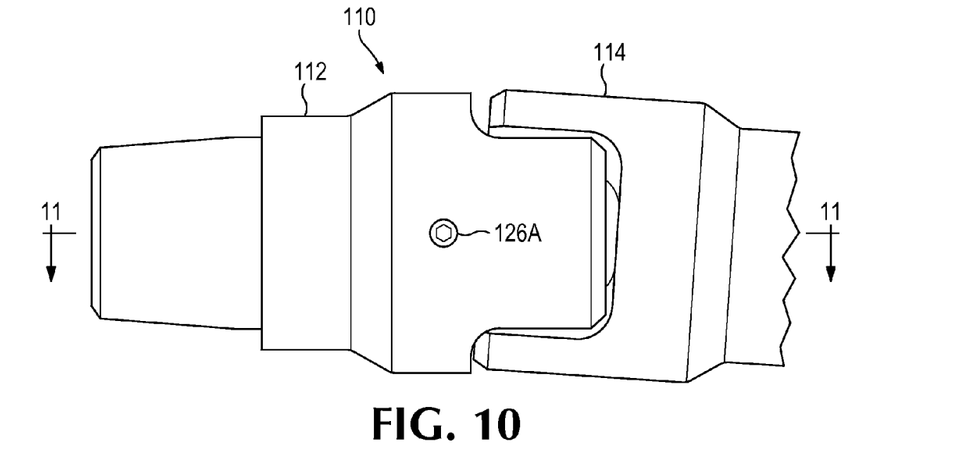
FIG. 10 is a side view of the universal joint of FIG. 7.
Figure 11:
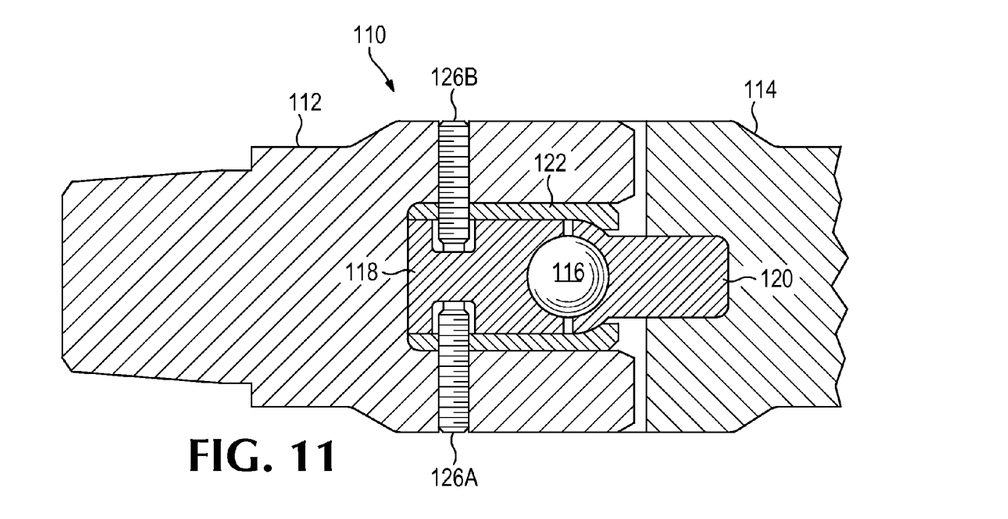
FIG. 11 is a cross section view of the universal joint of FIG. 7 at section 11-11.
Figure 12:
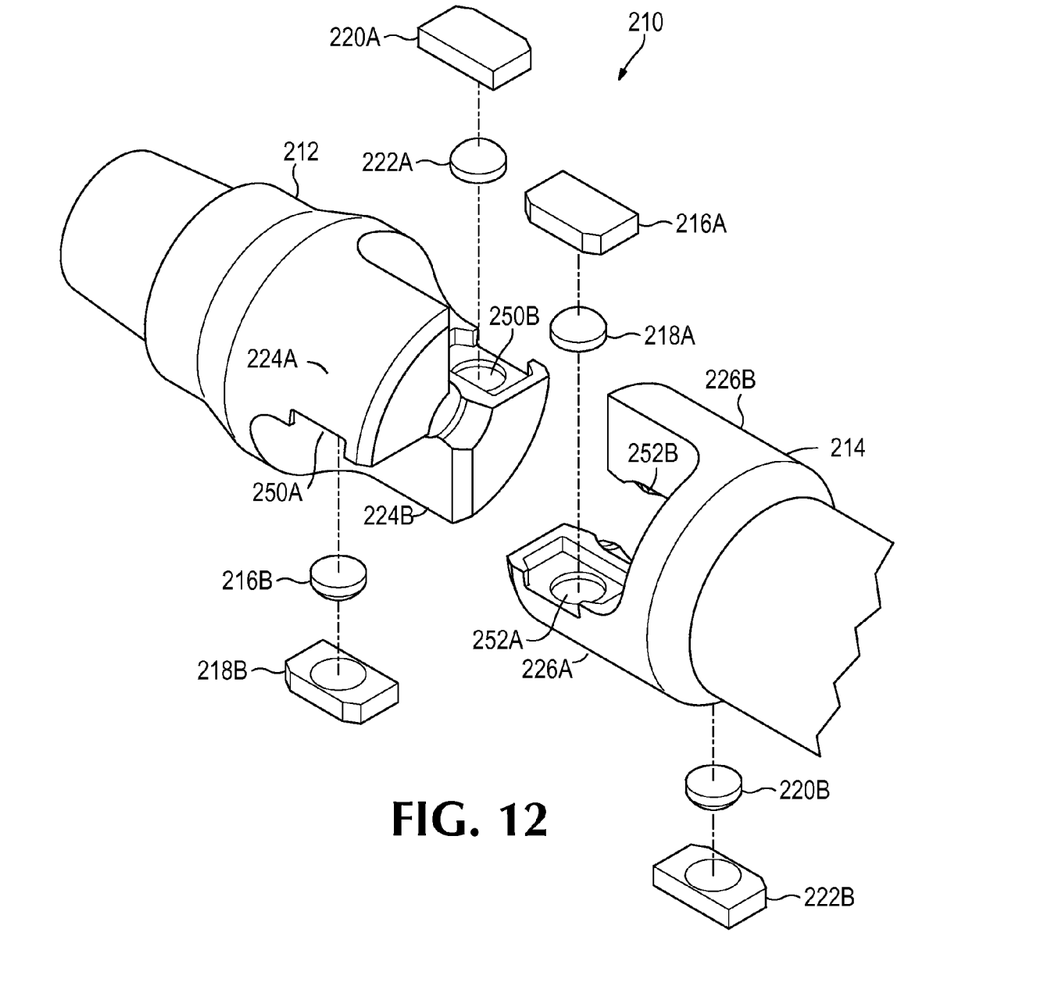
FIG. 12 is a perspective exploded view of a portion of another embodiment of a universal joint.
Figure 13:
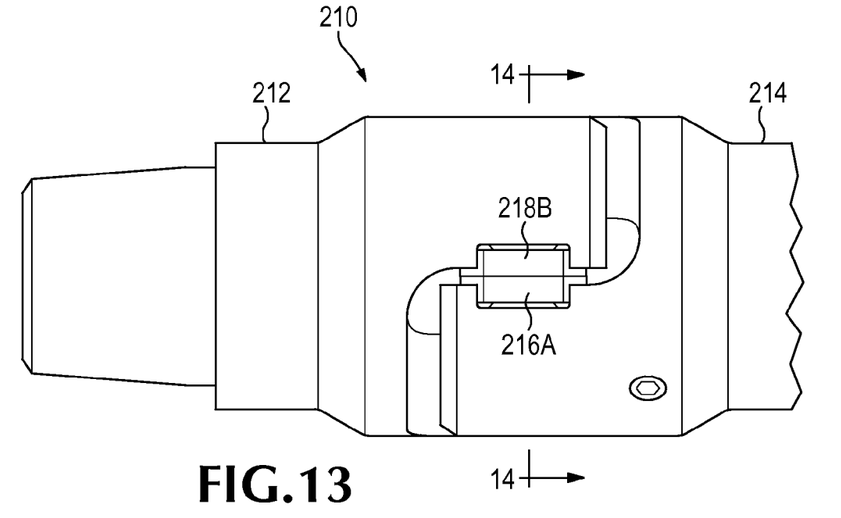
FIG. 13 is a side view of the universal joint of FIG. 12.
Figure 14:
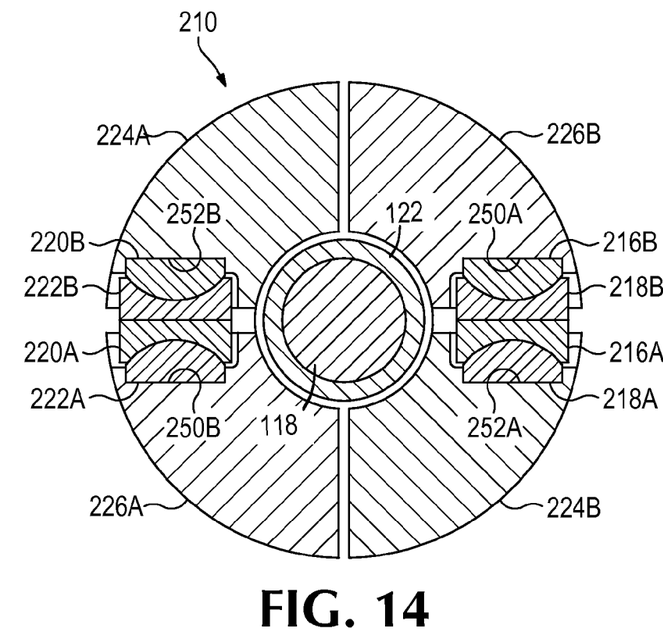
FIG. 14 is a cross section view of the universal joint of FIG. 12 as section 14-14.

In the above universal joints, the torque is transferred by contact of the arms 24 and 26. In an alternative embodiment, the arms include bearing surfaces oriented with the direction of rotation as shown in FIGS. 12-14. For clarity, the inner bearing assembly is not shown here. Universal joint 210 includes joint members 212 and 214 with arms 224A, 224B, 226A and 226B. Corresponding faces of arms 224A and 226A include recesses 250A and 252A. Corresponding faces of arms 224B and 226B include recesses 250B and 252B. For clarity only one pair of bearing assemblies will be described here in detail.

Recesses 250A and 252A preferably receive bearing supports and bearing faces 216A, 218A, 216B and 218B. The recesses include a portion that receives the bearing support. The bearing support has a rounded face and the recess has a corresponding rounded surface. The rounded surface allows the bearing support to pivot or articulate in the recess. With the bearing support received in the recess the bearing surface contacts the bearing support opposite the rounded face. The bearing surface is spaced from and floats above the recess. Normal vectors from the corresponding opposed bearing surfaces can be generally oriented toward and away from a direction of rotation. The normal vectors can be generally aligned on a plane that passes through a pivot point of the universal joint and is perpendicular to the longitudinal axis. Alternatively, other orientations of the normal vectors are possible.

The recess limits lateral movement of the bearing surface that would allow it to separate from the recess, but provides for limited rotation of the bearing support and bearing surface in the recess. The arms 224A and 226A when assembled are spaced from each other so the bearings are retained in the recesses with the arms engaged with each other but other retention methods of the bearing surfaces that perform a similar function are possible. Bearing assemblies on corresponding arms 224B and 226B are similarly configured and operate in a similar manner.

During operation, the faces of arms 224A and 226A cycle through a range of angular misalignment in relation to each other corresponding to misalignment of shafts of attached adjacent components. Bearing faces 216A and 218B can rotate on bearing supports 216B and 218A to maintain alignment with each other and to transmit torque efficiently through the bearing faces. The bearing faces continually accommodate and adjust to misalignment of the members as they rotate.

The universal joint can transmit significant torque during operation. Bearing surfaces which maintain a broad contact surface during operation limit erosion of the arms and allow replacement of the bearing surfaces at the end of their service life at a lower cost than replacing the bearing members. The bearing surfaces can also limit vibration and impact damage to the arms. Other combinations of features can be used. Alternatively, the rounded faces of the bearing support could face away from the recess and the bearing surface could have a corresponding rounded recess to receive the bearing support.

In a preferred embodiment relative movement between the upper and lower elements is limited by contact between the members. The sides and ends of the arms can contact adjacent arms that limit movement. The arms can be sized to make contact without significant wear or damage. In general the range of motion in any specific application will be known and well defined. The universal joint will be designed so that the elements will not reach the limit of their range of motion. Alternatively, the limit of the range of motion can be defined by the limit of movement of the retaining fasteners in their holes.

We claim:

1. A universal joint for a downhole drill string comprises:
an upper joint member with a first axis and longitudinally extending arms;
a lower joint member with a second axis and longitudinally extending arms, where the arms of the of the upper joint member engage the arms of the lower joint member to transmit torque, the upper joint member pivots about the lower joint member at a pivot point, and the first axis and second axis coincide at the pivot point; and
two or more fasteners passing through adjacent arms of the upper joint member and the lower joint member, wherein each of the two or more fasteners has a proximal end positioned in one of the arms of the upper joint member and a distal end positioned in one of the arms of the lower joint member.

2. The universal joint of claim 1 where the universal joint includes a ball bearing about which the upper and lower joint members pivot.

3. The universal joint of claim 2 where the upper joint member and the lower joint member each includes a bearing face to contact the ball bearing.

4. The universal joint of claim 1 where the fasteners passing through adjacent arms of the upper joint member and the lower joint member pass through holes formed in the upper joint member and the lower joint member, wherein the a diameter of the fasteners is less than a diameter of the holes to allow movement of the fasteners within the holes.

5. The universal joint of claim 1 where the fasteners passing through adjacent arms of the upper joint member and the lower joint member pass through holes formed in the upper joint member and the lower joint member, wherein a diameter of the holes in the upper joint member is different than a diameter of the holes in the lower joint member.

6. A universal joint for downhole drill strings comprising:
an upper joint member with longitudinally extending arms;
a lower joint member with longitudinally extending arms, the arms of the upper and lower joint members being intermeshed with each other;
fasteners extending between adjacent arms of the upper joint member and the lower joint member, wherein a proximal end of the fasteners is positioned in the arms of the upper joint member and a distal end of the fasteners is positioned in the arms of the lower joint member; and
a ball bearing being confined within the arms of the upper and lower joint members.

7. The universal joint of claim 6 including an upper bearing seat mounted to the upper joint member and a lower bearing seat mounted to the lower joint member, where the upper and lower bearing seats contact the ball bearing on opposite sides.

8. The universal joint of claim 6 where axial force is transferred through the ball bearing.

9. The universal joint of claim 6 where torque force is transferred through the extending arms.

10. The universal joint of claim 6 where tensile force is transferred through the fasteners.

11. The universal joint of claim 6 where the fasteners extending between adjacent arms of the upper joint member and the lower joint member passes through holes formed in the upper joint member and the lower joint member, wherein a diameter of the holes in the upper joint member is different than a diameter of the holes in the lower joint member.

12. A downhole tool for converting nutation to axial rotation comprising:
first axially extending arms about a first longitudinal axis;
second axially extending arms about a second longitudinal axis;
a ball bearing between the first and second arms defining a pivot point on the first and second longitudinal axes;
where the first longitudinal axis angularly deflects in relation to the second axis at the pivot point; and
for each of the first axially extending arms, a fastener having a proximal end positioned in the first axially extending arm and a distal end positioned in an adjacent one of the second axially extending arms.

13. The downhole tool of claim 12 where the first arms are generally parallel and the second arms are generally parallel.

14. The downhole tool of claim 12 where the first arms and first longitudinal axis remain parallel when deflecting about the pivot point.

15. The downhole tool of claim 12 where the arms are spaced from the ball bearing.

16. The downhole tool of claim 12 where the fastener prevents the first axially extending arms and the second axially extending arms from separating.

17. The downhole tool of claim 12 where the fasteners extending between each of the first axially extending arms and each of the second axially extending arms passes through holes formed in the first axially extending arms and the second axially extending arms, wherein a diameter of the holes in the first axially extending arms is different than a diameter of the holes in the second axially extending arms.

* * * * *